Aug. 17, 1965  R. J. COURTWAY  3,200,890
ORCHARD CULTIVATOR

Filed Jan. 29, 1962  3 Sheets-Sheet 1

INVENTOR.
Richard J. Courtway
BY
Wells & St.John
ATTYS.

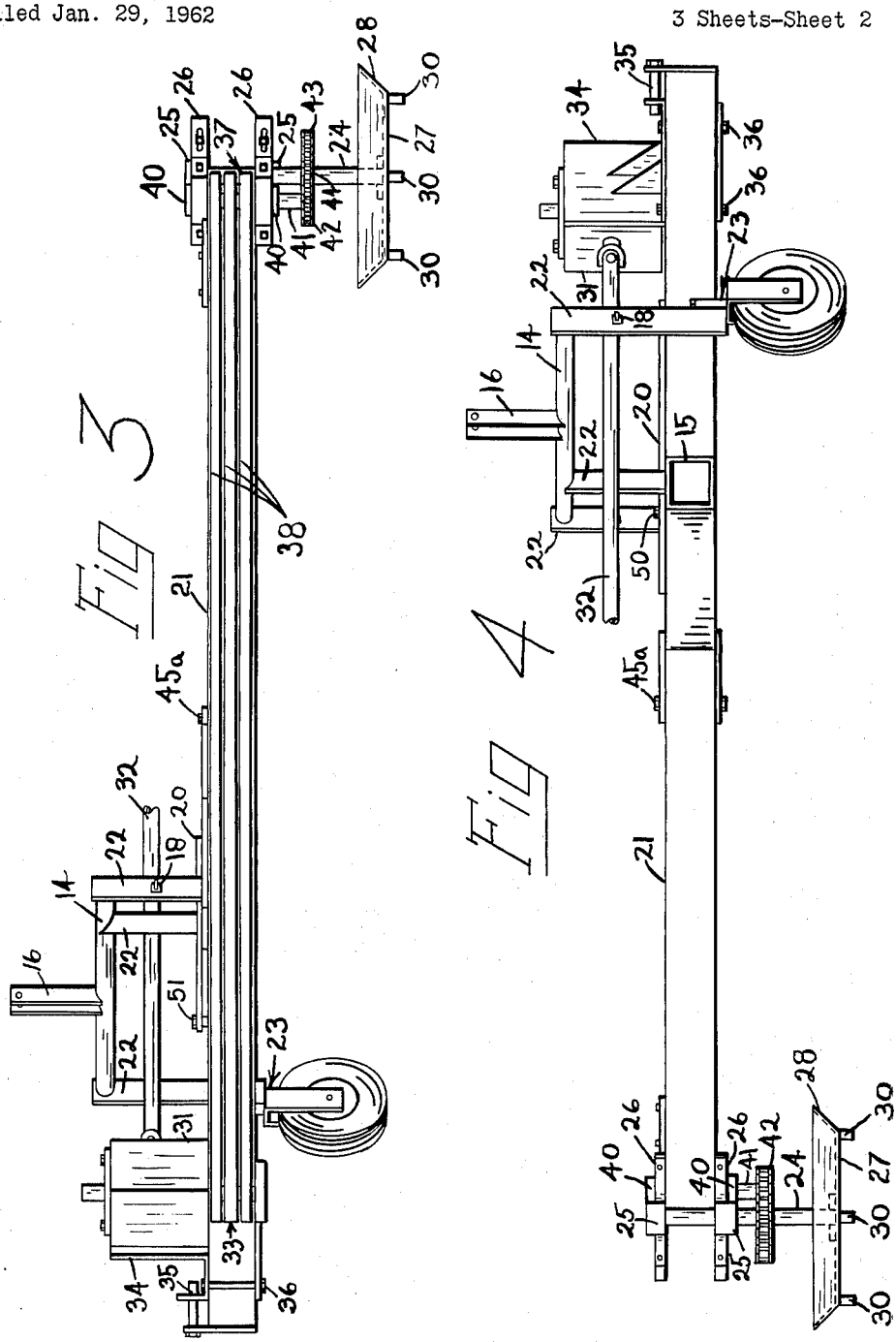

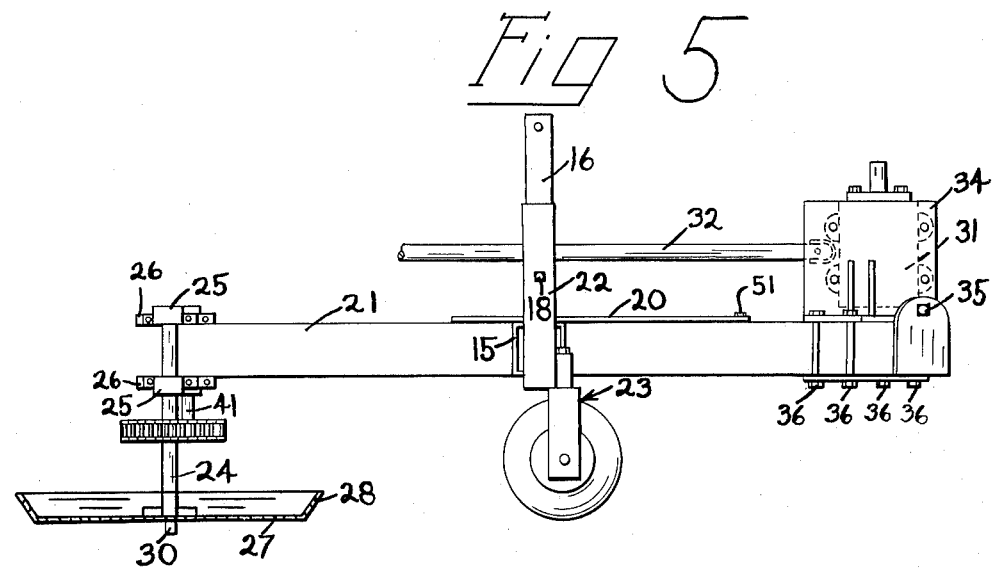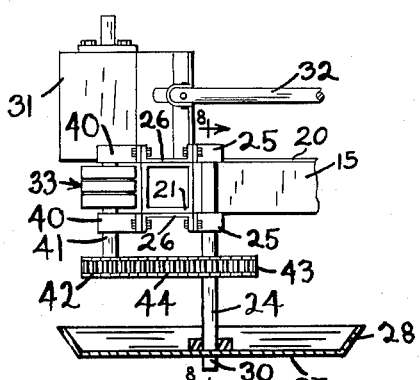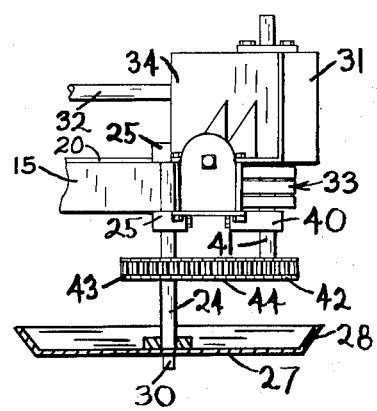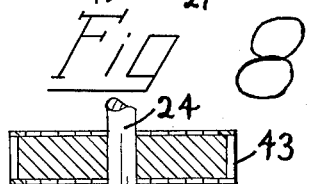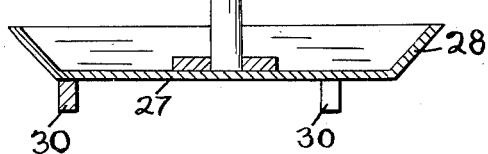
INVENTOR.
Richard J. Courtway
BY Wells & St John
ATTYS.

United States Patent Office 3,200,890
Patented Aug. 17, 1965

3,200,890
ORCHARD CULTIVATOR
Richard J. Courtway, Chelan, Wash.
Filed Jan. 29, 1962, Ser. No. 169,442
2 Claims. (Cl. 172—111)

This invention relates to a novel cultivator or power hoe for use in orchards. This device is particularly designed for cultivation directly adjacent the trunk of a tree.

The utilization of power cultivating equipment in an orchard presents difficulties due to the natural obstructions presented by the trunks of the trees themselves. Various devices have been offered to cultivate ground adjacent the trees. Such machines vary in complexity and normally have been proven to be unduly expensive or not as efficient as is desirable. The present invention contemplates a very simple cultivating apparatus which can be readily adapted to a common farm tractor. It provides effective cultivation of earth directly adjacent a tree trunk and can be operated without any skill other than that normally developed by any farm tractor operator. This device utilizes few moving parts and can be readily repaired or adjusted without special training or skill.

It is the first object of this invention to provide a cultivator for orchards utilizing a novel hoe element which is simple in construction and which requires no adjustment for proper use. The novel hoe constructed according to this invention is a rigid unit which includes a flat disk that rides along the ground surface being worked and which insures the proper depth control for the cultivating element.

The second object of this invention is to provide such a novel hoe element which is designed to keep itself free of trash and debris and which insures the cultivation of tall-standing grass or weeds. It is the hoe element itself which protects the moving elements of this apparatus from being entangled by weeds or tall grass.

Another object of this invention is to provide such a cultivator with a novel adjustable frame which can be readily adapted to the varying distances used to separate trees in orchards. The basic frame relationship necessary to the practice of this invention is maintained regardless of the adjustment utilized in each particular instance.

Another object of this invention is to provide a cultivator which is exceedingly simple in construction and which requires few moving parts. The basic drive mechanism is a simple pulley and belt apparatus which can be readily repaired or replaced in the field. No special tools or skills are required to maintain this device.

These and other objects will be evident from a study of the following description when taken in conjunction with the accompanying drawings which illustrate one preferred form of the invention. This form is presented merely as an example and is not intended in any manner to limit or restrict the scope of my invention which is defined in the claims which follow.

In the drawings:

FIGURE 3 is an enlarged view of the cultivator removed from a tractor as seen along line 3—3 in FIGURE 1;

FIGURE 4 is a view similar to FIGURE 3 but taken along line 4—4 in FIGURE 1;

FIGURE 5 is an enlarged view of the cultivator removed from a tractor as seen along line 5—5 in FIGURE 1 with the hoe element shown in section;

FIGURE 6 is an enlarged end view of the device as seen along line 6—6 in FIGURE 1 with the supporting members to the right being broken away and with the whole element being shown in section;

FIGURE 7 is an opposite end view as seen along line 7—7 in FIGURE 1 with the supporting members to the left being broken away and with the hoe element being shown in section; and FIGURE 8 is an enlarged section view of the whole element as seen along line 8—8 in FIGURE 6.

The present invention is concerned with a cultivator or hoe for use in orchards. While common tractor-drawn cultivating units are useful along these rows of trees in orchards, a problem exists in the areas directly adjacent the tree trunks. It is impossible to draw normal cultivating equipment close enough to the trees to maintain the ground surface in the desired cultivated stage. The time involved in accurately drawing such equipment near the trees is such that this practice is not practical. Also, it is necessary to cultivate to a very shallow depth when one approaches a tree trunk so as to avert possible damage of shallow roots directly adjacent the trunk. Therefore, the present invention has been devised to provide a simple and easily controllable cultivator or hoe which is readily adaptable to all orchard conditions.

Figure 1:
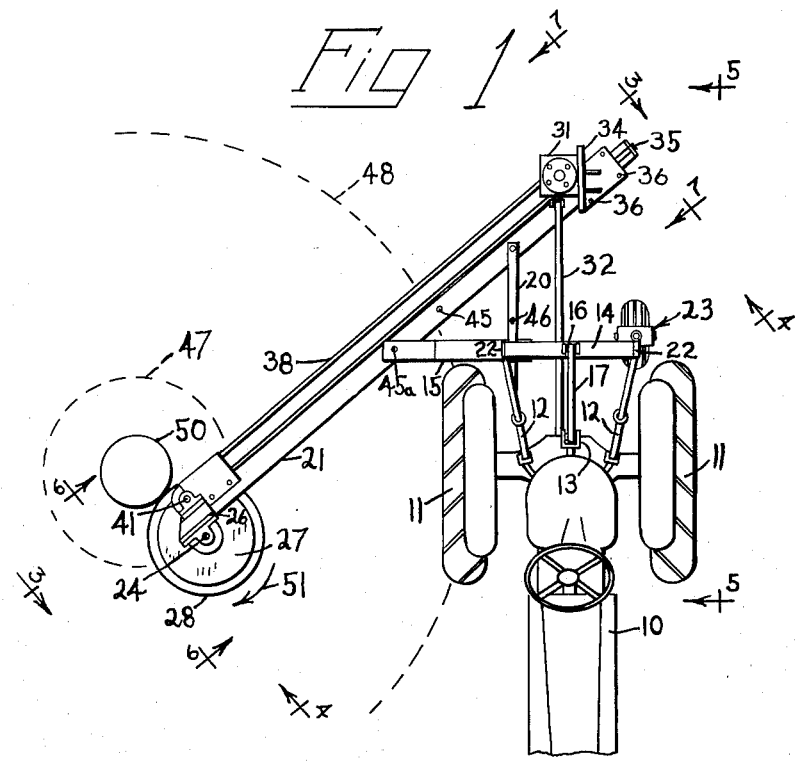
FIGURE 1 is a top view of my invention as mounted on a tractor, illustrating its use in an orchard.
Figure 2:
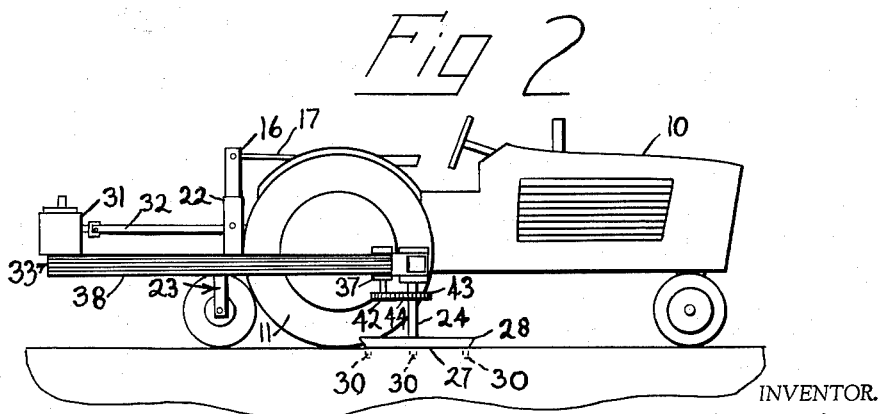
FIGURE 2 is a side elevation view of the device illustrated in FIGURE 1 as it would be seen from the left.

The over-all device is illustrated in FIGURES 1 and 2 as it would be used in a typical orchard. The cultivator is shown mounted on a common farm tractor 10 having rear wheels 11. The tractor is provided with a conventional three-point hitch having a pair of transversely spaced lift arms 12 and a central bracket 13. These conventional portions of the tractor 10 are unchanged in the practice of this invention.

The cultivator itself is provided with a triangular frame which is supported by the tractor along a transverse rod 14. The transverse rod 14 has rigidly secured to it three vertical braces 22. These braces 22 carry the remainder of the triangular frame. The two closely adjacent braces 22 shown toward the left in FIGURE 4 rigidly support a first horizontal member 15 which extends outwardly beyond the sides of the tractor 10. The member 15 is preferably formed of heavy rectangular tubular stock. Fixed to the rod 14 and extending upwardly therefrom is a bracket 16. The bracket 16 is secured to the bracket 13 on the tractor 10 by a connecting link 17. The link 17 may be a fixed link, as illustrated, or may be any suitable adjustable link so as to meet varying conditions. The two outside braces 22 are provided with outwardly-extended, horizontal pins 18 which are adapted to be pivotally connected to the respective lift arms 12. Thus, the three-point hitch of the tractor 10 may be utilized to lift either or both sides of the rod 14 and may vary the angular position of rod 14 relative to the tractor 10 in the conventional fashion. Since such hitches are widely used in the farm industry, no further description of this feature will be provided herein.

Extending rearwardly from the member 15 is a second horizontal member 20. Member 20 is secured to the member 15 by a bolt 50 or other suitable device. It is pivotally joined by a pin 51 to a third frame member 21 formed of heavy rectangular stock to complete the triangular frame. This third member 21 is a relatively long, straight element and forms an angle relative to each of the first two members 15 and 20. The member 21 extends forwardly at an angle so as to bring its outer end to a position slightly forward of the central axis of the axle for rear wheels 11 on the tractor 10. The basic frame of this device is completed by an outboard wheel assembly 23 of conventional design which is mounted on the remaining outside brace 22. The wheel assembly 23 is optional and is utilized mainly to balance the device in practical use. It relieves the three-point hitch from a portion of the pressure which would normally be applied thereto.

The hoe element is mounted at the outboard end of the third member 21. This includes a shaft 24 which is rotatably journalled about a vertical axis by a pair of bearings 25. Bearings 25 are secured to upper and lower channels 26 which, in turn, are fastened to the outer surfaces of the member 21. The position of shaft 24 is located forward of the axle of wheels 11 on tractor 10. The hoe further includes a circular, flat disk 27 which is securely fastened to the lower end of the shaft 24. The disk 27 is bounded by a continuous peripheral rim 28 which extends upwardly and outwardly from the edge of disk 27 as an integral unit. The hoe proper is completed by three lugs 30 fastened to the lower surface of disk 27 adjacent its periphery. Each lug 30 is merely a solid rectangular bar which protrudes downwardly and provides the cultivating member of the hoe assembly.

The drive mechanism by which shaft 24, disk 27, and lugs 30 are rotated is very simple both in structure and operation. It includes a standard right-angle transmission 31 which is movably mounted on the member 21 by means of an adjustable mount 34. The adjustable mount 34 may be shifted longitudinally along the length of member 21 by means of a top horizontal bolt 35. Mount 34 may be secured to the member 21 at the desired position by means of four clamping bolts 36. The output of transmission 31 consists of a multiple pulley 33 which is located directly beneath it. Transmission 31 is driven by a shaft 32 connected to the power take-off of tractor 10 in the conventional manner which may include necessary telescopic and universal joint connections.

Mounted at the outboard end of member 21 is a second pulley 37, identical to the pulley 33 of transmission 31. The outboard pulley 37 is fixed to a shaft 41 rotatably journalled by bearings 40 which are also secured to the channels 26. The pulleys 33 and 37 are drivingly connected by a series of continuous belts 38.

The rotation of the power take-off is finally transmitted to the hoe shaft 24 by means of a simple sprocket drive. This includes a first sprocket 42 fixed to the shaft 41 below the pulley 37 and another sprocket 43 fixed to the shaft 24 above the disk 27. The two sprockets 42 and 43 are drivingly connected by a chain 44. In practice it has been found that a reduction drive is necessary for proper use of this implement and therefore the sprocket 43 is preferably twice the size of sprocket 42 so as to provide a 2 to 1 reduction drive from the power take-off to the shaft 24.

The hoe apparatus is designed to ride along the ground surface and to cultivate the soil as the lugs 30 are rotated about the axis of shaft 24. The flat nature of the disk 27 provides even contact of all lugs 30 so that the soil will be continuously cultivated to a constant depth throughout the area contacted. The disk 27 and rim 28 are sufficiently wide so as to cover the area beneath the chain 44, as may be seen in FIGURES 6 and 7. This feature allows the dished rim 28 to bend tall weeds and grasses before they become entangled in the chain 44 and the adjacent mechanisms. Thus, trouble-free service of the drive mechanism is insured by the very nature of the hoe assembly. The dished rim 28 also knocks down such weeds so that they can be entangled and uprooted by the lugs 30. The lugs 30 clean themselves of such weeds after cultivation, probably by the rubbing action of the soil when contacted by the weeds and lugs 30. The hoe, in practice, remains clean and operative regardless of soil and trash conditions.

Since the spacing of trees in orchards varies, depending upon many factors, it is necessary to provide a framework which can be adjusted so as to insure the proper radial distance between the hoe and tractor in every instance. In order to accomplish this variation without losing the necessary relationship of the shaft 24 being maintained slightly forward of the wheel axis of wheels 11, a pair of apertures 45 are provided along the length of member 21. The apertures 45 receive bolts 45a which secure the member 15 to the third member 21. A second source of adjustment is provided by a pair of apertures 46 which are formed along the member 20 and by which the member 20 may be adjustably secured to the member 15 by reception of bolt 50. By varying the position of these connections, each individually or in concert, one may adjust the position of the hoe relative to the tractor while maintaining the necessary angular relationship so as to insure that the hoe will remain in its forward position.

The forward position of the hoe is important so as to prevent the disk 27 from standing stationary or backing up in actual practice. The desired locus of the shaft axis is designated at 47 in FIGURE 1. This is shown circumscribed about a tree trunk 50, while the locus of the wheels 11 is designated by an arc at 48. The maintenance of the locus 47 is extremely simple when the frame relationships as described above have been insured. One must merely guide the tractor 10 in a circle about the tree, and the hoe will be maintained in the necessary circle so as to cultivate the soil directly adjacent the trunk 50.

Disk 27 may be rotated in either direction about its central axis by simple reversal of transmission 31. Arrow 51 in FIGURE 1 shows the disk 27 rotated so as to throw trash toward the tree to conserve moisture and protect the base of the tree from the sun. For mice control, one would reverse the direction of rotation and thereby clean debris from the area adjacent the trunk 50.

The hoe is always maintained in a proper elevational position. During motion of tractor 10 the rim 28 acts as a moving skid so as to ride over the ground surface. The wide flat disk 27 prevents the lugs 30 from digging beyond their own depth even though tractor 10 may be stationary. The lugs 30 are in no danger due to rocks since they will merely glance over obstructions or rocks engaged thereby. The entire frame may be lifted for travel in the field and can readily be folded along the side of the tractor by release of the member 20. The wide rim of the disk 27 protects the tree trunks from damage should they accidentally be touched during the cultivation, and there is no danger whatsoever of the inwardly-set lugs injuring the fragile tree surfaces.

Other modifications of this invention may be obvious to some one skilled in this field, and therefore my invention is not to be limited except as it is designed in the claims which follow.

Having thus described my invention, I claim:

1. An apparatus for hoeing about trees, comprising:
   a first horizontal member adapted to be movably mounted at the rear of a farm tractor, said first member being extended outwardly at one side thereof;
   a second horizontal member secured to said first member and extending rearwardly therefrom;
   a third horizontal member connected to the outer extermities of said first and second members and extending forwardly from these connections at an angle relative to both of said first and second members;
   a shaft rotatably journalled on said third member about a vertical axis located adjacent the forward end of said third member, said shaft extending downwardly from said third member;
   a hoe fixed to the lower end of said shaft including a flat circular ground engaging disk bounded by a continuous peripheral rim extending upwardly and outwardly therefrom, and a plurality of downwardly protruding lugs fixed to the lower surface of the disk;
   and drive means mounted on said third member operatively connected to said shaft adapted to rotate said shaft about its axis, comprising:
   a transmission mounted on said third member adapted to be powered by a tractor power take-off, the output of said transmission being a pulley mounted about a vertical axis;

a pulley identical to said first-named pulley and spaced therefrom on said third member;
a belt drivingly connecting said two pulleys;
a first sprocket fixed to said shaft;
a second sprocket fixed relative to the second of said pulleys;
and a chain drivingly connecting said first and second sprockets.

2. An apparatus for hoeing about trees, comprising:
a first horizontal member adapted to be movably mounted at the rear of a farm tractor, said first member being extended outwardly at one side thereof;
a second horizontal member secured to said first member and extending rearwardly therefrom;
a third horizontal member connected to the outer extermities of said first and second members and extending forwardly from these connections at an angle relative to both of said first and second members;
a shaft rotatably journalled on said third member about a vertical axis located adjacent the forward end of said third member, said shaft extending downwardly from said third member;
a hoe fixed to the lower end of said shaft including a flat circular ground engaging disk bounded by a continuous peripheral rim extending upwardly and outwardly therefrom, and a plurality of downwardly protruding lugs fixed to the lower surface of the disk;
and drive means mounted on said third member operatively connected to said shaft adapted to rotate said shaft about it axis;
the respective connections between said first and second members and between said first and third members are adjustable to thereby vary the angle subtended by said third member relative to said first member, the length of said third member being such that the axis of said shaft always remains forward of the rear axle on the tractor on which the apparatus is mounted.

References Cited by the Examiner

UNITED STATES PATENTS

| | | | |
|---|---|---|---|
| 2,489,633 | 11/49 | Fulgham | 172—111 X |
| 2,531,557 | 11/50 | Dayton | 172—38 |
| 2,651,249 | 9/53 | Morkoski | 172—98 X |
| 2,718,836 | 9/55 | Pertics et al. | 172—11 X |
| 2,766,675 | 10/56 | Suck | 172—523 |
| 2,766,835 | 10/56 | Witt | 172—47 X |
| 2,791,081 | 5/57 | Allen et al. | 172—99 X |
| 2,791,953 | 5/57 | Erickson et al. | 172—79 X |
| 2,951,547 | 9/60 | Lawrence | 172—523 |
| 2,974,469 | 3/61 | Smith et al. | 172—79 X |
| 2,974,735 | 3/61 | Smith et al. | 172—81 X |
| 3,028,919 | 4/62 | Smith et al. | 172—47 |
| 3,066,745 | 12/62 | Smith et al. | 172—59 |
| 3,117,632 | 1/64 | Caggiano | 172—59 |

FOREIGN PATENTS

| | | |
|---|---|---|
| 228,692 | 6/60 | Australia. |
| 1,153,466 | 10/57 | France. |
| 703,134 | 1/54 | Great Britain. |

ABRAHAM G. STONE, *Primary Examiner.*

T. GRAHAM CRAVER, A. JOSEPH GOLDBERG,
*Examiners.*